United States Patent [19]

Lechner

[11] 3,938,105
[45] Feb. 10, 1976

[54] SEQUENTIALLY ENCODED DATA STRUCTURES THAT SUPPORT BIDIRECTIONAL SCANNING

[75] Inventor: Robert J. Lechner, Needham, Mass.

[73] Assignee: Honeywell Information Systems Inc., Waltham, Mass.

[22] Filed: June 24, 1974

[21] Appl. No.: 482,406

[52] U.S. Cl. .............................. 340/172.5; 360/48
[51] Int. Cl.² ............................................ G06F 7/00
[58] Field of Search ................ 235/152; 340/172.5; 360/27, 48, 49, 72, 137; 444/1

[56] References Cited
UNITED STATES PATENTS

| | | | |
|---|---|---|---|
| 3,366,928 | 1/1968 | Rice et al. | 340/172.5 |
| 3,387,293 | 6/1968 | Stockebrand | 360/48 |
| 3,439,344 | 4/1969 | Stanga | 340/172.5 |
| 3,688,286 | 8/1972 | Bennett et al. | 360/48 |
| 3,766,529 | 10/1973 | McLaughlin | 340/172.5 |

*Primary Examiner*—Joseph F. Ruggiero
*Attorney, Agent, or Firm*—Nicholas Prasinos; Ronald T. Reiling

[57] ABSTRACT

A coding method and apparatus that supports bidirectional scanning is disclosed for sequences of fields of variable length and/or type. Symmetric difference separators of the two immediately adjacent data field types are generated by exclusive-OR addition and utilized as punctuation marks to support bidirectional scanning. Parity checking techniques and hardware are utilized to resolve boundary alignment problems when a separator is in error. An extension of the concept of the invention to hierarchical parenthesized structures permit skipping over subtrees without scanning their contents.

21 Claims, 8 Drawing Figures

SEQUENTIALLY ENCODED DATA STRUCTURES THAT SUPPORT BIDIRECTIONAL SCANNING

BACKGROUND

1. Field of the Invention

This invention relates generally to encoded data structure techniques and computer hardware, and more particularly to a coding method and computer hardware that supports bidirectional scanning of fields, which is economical in space, time and money.

2. Description of the Prior Art

In serial storage of data in a computer system a basic problem is that of identifying the type and/or length of unpredictable sequences of character-string data or fields. A fundamental requirement in connection with this problem is that the data sequence must be scannable in either direction.

There are two generally known prior art methods of encoding such sequences. One way is to reserve one or more "field separator" characters, which are not legal characters. (See E. H. Beitz, The Interpretation of Structured Stored Data Using Delimiters, Proc. 1970 ACM SIGFIDET Workshop on Data Description & Access, November, 1970, pp. 188–200). A cyclic FIFO buffer is utilized, in which a single pointer defines the current data entry point. Field names and/or lengths are stored adjacent to their value strings. FIG. 1 depicts such a prior art scheme wherein the field names and/or lengths $A_1$, $B_1$, $C_1$ and $D_1$ are stored adjacent to their respective value strings, Value $(A)_1$, $(B)_1$, $(C)_1$ and $(D)_1$. The letters $L(A)_1$, $L(B)_1$, $L(C)_1$ etc., refers to the lengths of the value fields respectively. To scan the buffer from left to right, the next field's starting address is computed by adding the preceding field's length and starting address. Unfortunately, however, with this technique right-to-left scan is not possible, because the value field is encountered first, and its name cannot be located without knowing its length, and vice versa.

Another prior art approach shown on FIG. 2 avoids this last restriction and permits random access to fields by segregating field names $A_2$, $B_2$, $C_2$ and $D_2$ from their value text Value$(A)_2$, Value$(B)_2$, Value$(C)_2$ etc. The field names are assumed to be fixed length and are kept in a separate ordered list, which can be indexed or scanned from either end. Before writing a tape block, the sequence of field names is appended to the value string sequence. FIG. 2 shows this solution, with field names $A_2$, $B_2$, $C_2$ and $D_2$ stored in reverse order from their value text Value $(A)_2$, $(B)_2$, $(C)_2$ etc., starting at the end of the data block. Names and values are accumulated simultaneously and both share a common pool of unused byte-cells in the middle of of the data block. However, this technique has the disadvantage of complicating physical concatenation of data and/or logical chaining.

One unique solution to the problem not believed to be in the prior art and still able to overcome one-directional scanning limitations is shown in FIG. 3A, wherein field names $A_3$, $B_3$, $C_3$, $D_3$ are embedded before and after each corresponding value string Value $(A)_3$, $(B)_3$, $(C)_3$, $(D)_3$ respectively. An obvious disadvantage with this technique, however, is that it doubles the space required to store the field names. What is needed is a technique which while overcoming one-directional scanning limitations, is at the same time economical in its use of space as well as of time and money.

OBJECTS OF THE INVENTION

A primary object of the invention therefore is to provide improved coding apparatus and a method for bidirectional scanning of sequence of fields of various length and/or type.

Another object of the invention is to provide a method and apparatus for generating symmetric difference separators of any two immediately adjacent data fields to support bidirectional scanning.

Still another object of the invention is to provide parity checking techniques and hardware to resolve boundary alignment problems when a symmetric difference separator is in error.

These and other objects of the invention will become apparent from the description of a preferred embodiment of the invention when read in conjunction with the drawings contained herewith.

SUMMARY OF THE INVENTION

Bidirectional scanning for sequences of fields of variable length and/or type is supported by a symmetric difference (or Boolean difference)$\Delta$ $AB$ which is the carry-free exclusive OR (bit-wise modulo-two) sum of the binary codes representing the type or length for any two adjacent fields A and B (i.e. $\Delta AB = A \oplus B$. The symmetric difference of any two adjacent fields is generated by computer hardware, and is used as a punctuation mark or separator between said adjacent fields. Once symmetric differences have been generated for sequences of adjacent fields as shown in FIG. 3B scanning of these sequences of fields may proceed in either direction right or left.

For example, assume that a left to right scan of FIG. 3B has just begun. Given the identity of the first field $(A)$, it is desired to identify the (unknown) second field $(A)_1$ as type B. The field length of Value (A) field is obtained from a table of field lengths or directly from separator A. The $\Delta AB$ field is then located and the difference $\Delta$ $AB$ is exclusive-OR added to the known field name $A$ to give B. Similarly, $\Delta BC$ is located relative to $\Delta AB$ via the length of field Value (B) which has previously calculated as B, and exclusive-OR added to obtain C (i.e. $C = B \oplus \Delta BC$). Since $B = C \oplus \Delta BC$, and $A = B \oplus \Delta AB$, etc., this procedure works equally well when beginning at the right side and scanning left, when the identity of the right-most field is extracted upon block entry from the right-most separator appended to this field.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description taken in conjunction with the drawings in which:

GENERAL DISCUSSION

1. Representation of Variable Data Field Sequences

Sequential data entry and recording on serial media, such as tape cassettes, is conveniently accomplished by using a double-ended FIFO buffer or "deque" with top and bottom end markers, keyboard input (load) and tape output (write) pointers (D. R. Knuth: The Art of Computer Programming Vol. I Fundamental Algorithms, Addison-Wesley, Reading, Mass. 1968). Logically, the buffer is cyclic, with no attention paid to the physical top and bottom end addresses. Logically, these ends are joined together by computing addresses modulo the buffer size; that is, when "one" is added to the bottom end address, the result is the top or start address. In the most general case, tape block reading or writing (physical I/O) from one sector of the buffer can go on concurrently with data field insertion or extraction from another buffer sector (logical I/O).

The problem considered in this disclosure is that of storing a sequence of data fields of varying type. Two application requirements occur together, wherein the FIFO buffer organization described above runs into difficulty:

1. Optional or Varying Occurrences: Some field types may have optional or varying numbers of occurrences as attributes; in either case, the next field type is sometimes unpredictable, so that field type identifiers (names) must be recorded along with the data.

2. Bidirectional Scanning: When backward as well as forward scanning of the data file is required, field by field, the quene becomes double-ended on the tape or physical I/O side.

Requirement (1) is motivated by a desire for flexible source data formating or seven free-form (self-describing) data entry. Requirement (2) is implied by functions such as editing or on-line correction which make use of a "backspace one field" operator or function key, or a bidirectional scrolling facility using a CRT display.

Figure 1:
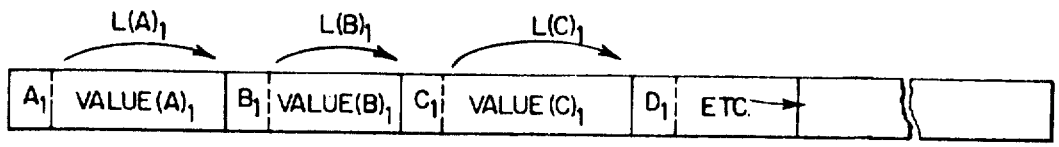
FIGS. 1 and 2 are prior art solutions to the problem.
Figure 3:
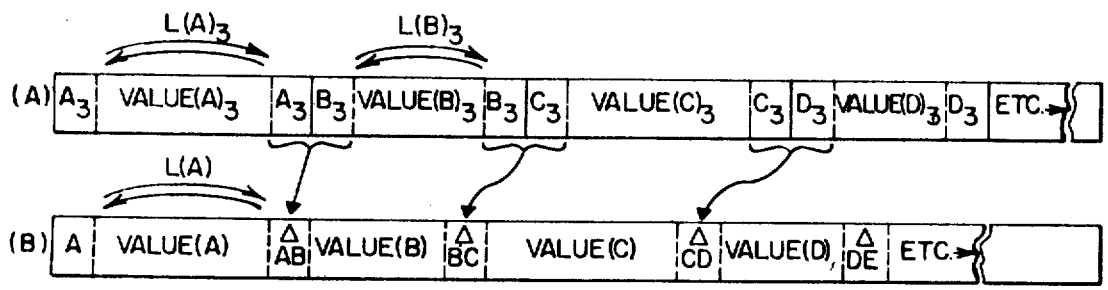
FIG. 3A is another solution to the problem not found in the prior art, but helpful in explaining the invention.
FIG. 3B is one embodiment of the sequentially encoded data structure of the invention that supports bidirectional scanning.

Recommended Solution — One way to overcome the one-directional scanning limitation of the format in FIG. 1 is to embed a field name before and after its value string (see FIG. 3A and background discussion). However, this doubles the space needed to store field names. The recommended approach is a simple extension of this format which avoids duplicate storage of field names. (See FIG. 3B).

FIG. 3A shows each field value with a name (one-byte symbol A, B, etc.,) at both ends. In FIG. 3B except for the initial and final field name, the two symbols separating each pair of field values have been combined into one symbol, the "symmetric difference" between the two field names it replaces. The initial and final field names may be regarded as symmetric differences that result from combining with the "all zeros" name.

The symmetric difference (or Boolean difference) $AB$ is defined as the carry-free exclusive-OR (bit-wise-modulo-two) sum of the binary codes for A and B: $AB = A + B$. When A and B are $k$-bit symbols, the signed algebraic difference $AB = (B-A)$ or the ring sum $A+B$ (mod $2^k$) would work equally well, but the symmetric difference is simpler and faster on machines with an exclusive-OR instruction. The other two operations must be replaced by subtraction when the direction or scan is reversed, but the exclusive-OR operation is independent of the direction of scan.

There are two alternate interpretations for the codes A and B on which the symmetric difference is based. In FIG. 3B, an indirect or variable-field-type interpretation, A and B are the actual values of field type codes, and the A and B value field lengths are assumed stored in a separate table indexed by the field type code. In the second or alternate interpretation, A and B are the actual value field lengths. The second or alternate interpretation in which the type codes are identified directly with field length, will be discussed later.

For example, suppose we have just begun a left to right scan, in FIG. 3B. Given the identity of the first field (A) we wish to identify the (unknown) second field as type B. We add the difference $\Delta AB$ to the first field name $A$, after locating $\Delta AB$ by looking up field $A$'s length in a table. We locate $\Delta BC$ relative to $\Delta AB$ via the length of $B$, and then compute $C = B \oplus \Delta BC$ to identify the third field. Since $B = C \oplus \Delta BC$ and $A = B \oplus \Delta AB$, etc., this procedure works equally well when beginning at the right side and scanning left, if the identity of the right-most field is known upon block entry.

2. Other Applications

The above solution assumed a relatively small number (at most 255) field types, each of known constant length, repeated often enough to justify a stored table of field lengths. Other applications will now be considered.

Text Editing — For interactive text editing, a bidirectional scan has obvious advantages. A minor change to the semantics of the scanning algorithm permits its application to a contiguous sequence of words or other "atomic" elements of text.

One important consideration is that now the fields are not merely repetitious instances of a few ( ≤ 255) fixed-length field types. In fact, all of the fields might just as well be considered as members of a single, variable-length field class. Now we have at least 255 field identifiers to use for other purposes (zero is reversed for the null field identifier). Therefore define all words of length $k$, $1 \leq k \leq 255$, as members of the $k$-th field class, and assign the binary value of $k$ as identifier for this class. (The reserved null field type is consistent with this convention). Symmetric difference separators are now computed as before, with one additional advantage: the table which formerly defined field length (when indexed by field type) now becomes the identity map and is no longer needed.

Introducing symmetric difference codes as field separators need not involve any expansion of text volume. For example, suppose an "atomic" element of text is defined to be any contiguous string of non-space characters between two space characters. Without loss of generality, every pair of contiguous space characters may be regarded as bracketing a null or zero length atomic element. Then, every sequence of space characters may be replaced by an equal-length sequence of field separators, coded as symmetric differences.

For example, let the values of two fields A and B be "the" and "word", respectively. Adopt the convention that an underlined digit represents the 8-bit binary code for itself; e.g., 7 denotes the bitstring "00000111". Then the type codes for fields A and B are identified with their lengths and become 3 and 4 respectively. The symmetric difference $\Delta AB = 3 \oplus 4 = 7$. The text strings below are mapped into symmetric-difference-coded equivalents without changing their lengths in bytes (" # " represents one space):

a. "the # word " "the7word"
b. "the # # word" "the34word"
c. "the # # . . . # # word" "the30 . . . 04word"

In (a), $\Delta AB$ replaces one space characters: in (b), $\Delta A0$ $\Delta 0B$ replaces two spaces; in (c), $\Delta A0$ $\Delta 00$ ... $\Delta 00$ $\Delta 0B$ replaces a corresponding number of spaces.

One disadvantage of this length-preserving text-encoding method is that it does not separate punctuation marks from alphanumeric strings within atomic elements of text. However, a punctuation symbol which is immediately preceded and/or followed by an alphanumeric string may be encoded as a separate one-byte field by artificially inserting a separator before and/or after the punctuation symbol. This expands the text by one or two extra bytes per punctuation symbol. Upon decoding, these separators are replaced by null fields rather than space characters. (Later with respect to tree structures the convention will be adopted that a null field exists between any two adjacent separators).

Dictionary Look-Up — All of the above text editing considerations apply equally well to dictionary (e.g., symbol table) look-up. To expedite searches, a very long string of lexicographically ordered words is partitioned into blocks, for which an index table is also prepared. Index table entries point to block end points which contain field lengths, rather than symmetric differences, as in FIG. 3B. This permits bidirectional scanning from multiple entry points.

Variable-Length Fields with a Fixed Sequence of Types — Both applicaations above may be regarded as the special case ($n=1$) of a data stream with multiple field types in which the type sequence is predictable but field lengths are variable and must be encoded into symmetric differences. For example, cardformatted data with exactly one instance of each field type could use symmetric difference coding to suppress leading zero and/or trailing blanks.

Fields of Unpredictable Type and Length — When neither field type nor length can be inferred from the other then symmetric difference coding of both length and type is possible. In general, this will involve more than 8 bits per separator; for example, a two-byte separator may be utilized.

3. Error Protection

All encoding methods which build up a field address by incremental addition of preceding field lengths are vulnerable to the error extension problem, or multiple errors caused by a single erroneous field length indication. In general, this will force all succeeding field boundaries out of alignment and manual interpretation may be necessary to recover their data. Accordingly, a single-error-detection method using a one-way scan is utilized whereas for correction a two-way scan is utilized.

Figure 2:
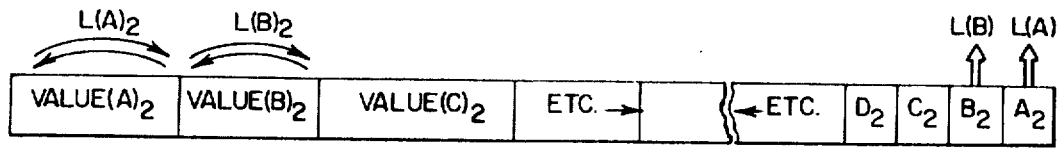

Error extension can be avoided completely by recording a separate table of relative addresses or offsets to individual fields, as in FIG. 2, but with other disadvantages discussed earlier. Another way is to take advantage of the unique parity checking feature of symmetric difference coding. This provides error detection and correction advantages equivalent to the use of two redundant pointer chains as shown below.

Padding — One requirement for effective error control is the ability to partition a sequence of variable-length fields into blocks of fixed length. In general, field boundaries will not coincide with block boundaries. To avoid splitting a field into two parts (which introduces a new coding problem) and to permit resynchronization of the field address pointer at inter-block boundaries, a block is padded preferably by some method which does not complicate the logic of the scanning algorithm.

Padding is accomplished by reversing a particular 8-bit symbol (or 8-tuple) to indicate a "null" field type, defined as one whose value string has zero length. To be consistent with those applications which replace a field's type code by its value string length in bytes, the zero 8-tuple is reserved as a null field type code.

Null field values take up no space, but their separators do. The scanning algorithm still works, and a small amount of logic to recognize and skip over null field separators will make them transparent to the scan algorithm.

Two non-null fields (say, field types $A$ and $B$) with value strings denoted $V_A$, $V_B$ and separator denoted $\Delta AB$ appear as follows in FIG. 3B:

$V_A \Delta AB V_B$

To insert a null field (type 0) between A and B, we merely replace $\Delta AB$ by the two separators $\Delta A0$, $\Delta 0B$; (this inserts one extra byte into the field stream). Two null fields between A and B appear as $V_A \Delta A0 \Delta 00 \Delta 0B$ $V_B$. (Each underlined triple represents a one-byte field separator). Each additional null field introduces another $\Delta 00$ separator, whose value is $0 \oplus 0 = 0$.

Self-identification — In order to begin a field scan at either block boundary it is necessary to know the identity of the first field to be scanned. For this purpose it is sufficient to adopt the convention that at least one null field will always be inserted at every block boundary.

Suppose a block boundary occurs between fields A and B of the preceding example. Within the field stream $V_A \Delta AB V_B$, the separator $\Delta AB$ must be assigned either to the block containing $V_A$ or to the one containing $V_B$. Neither choice is satisfactory. For example, if $\Delta AB$ is stored with $V_B$, then a backward scan into the block containing $V_A$ requires prior reference to succeeding blocks before field type $A$ (and its length) can be identified.

This problem disappears if two null field separators straddle the block boundary. For example, with a boundary between $\Delta A0$ and $\Delta 0B$ in the field sequence $V_A \Delta A0 \Delta 0B V_B$, the scanning algorithm will encounter a separator ($\Delta A0$ or $\Delta 0B$) no matter which direction is begins to scan. Because zero represents the null field type, $\Delta A0 = A \oplus 0 = A$ $\Delta 0B = B \oplus 0 = B$. In other words, null fields have the nice property that adjacent separators directly identify the adjacent field type. In other words, the two fields at the edges of any block are self-identifying, if blocks are padded to avoid splitting fields and at least one null field is inserted at block boundaries.

Resynchronization — Null field insertion at block boundaries makes each block independent of adjacent blocks, as far as the field scan process is concerned. However, a correct field scan from one end of a block to the other still requires all intervening field separators to have correct values. What if an error occurs?

Consider first the error detection problem. If null fields are "inserted" at both block boundaries, a correct sequence of field separators will automatically have a zero-valued longitudinal parity check sum. For example, suppose a block contains four fields; A, B, B, C; the sequence of field separators and interspersed value strings will be $\Delta 0A\ V_A\ \Delta AB\ V_B\ \Delta BB\ V_B\ \Delta BC\ V_C\ \Delta C0$ By definition,
$\Delta 0A = A, \Delta AB = A \oplus B$, etc., the parity check sum of these five separators is
$\Delta 0A \oplus \Delta AB \oplus \Delta BB \oplus \Delta BC \oplus \Delta C0 =$
$A \oplus (A \oplus B) \oplus (B \oplus B) \oplus (B \oplus C) \oplus C =$
$(A \oplus A) \oplus (B \oplus B) \oplus (B \oplus B) \oplus (C \oplus C) = 0$ by the associative property of exclusive-OR addition. That is, field type or length codes appear in pairs, causing pairwise cancellation in the overall checksum. In conclusion, this zero checksum property permits rapid detection of separator errors. It also discriminates between separator and value string errors if an overall error detection coding scheme is also used. Often, block lengths can be restricted to make the probability of more than one separator error per block negligible.

Assuming a single separator is in error, how can its location be established without ambiguity? A nonzero check sum over the correct location of an erroneous field separator sequence would yield the error pattern but not its location. However, this actual checksum is not computable because the computed sequence of separator addresses may diverge from the correct locations beyond the point of error. The solution is to begin checking from the opposite end as well.

It is easily verified that whenever the two sequences of separator addresses (starting from opposite ends of the block) have only one address in common, then their point of contact is the erroneous separator location. In this case, the correct separator value is the symmetric difference of the field type codes computed by the two scans just prior to their point of contact, since this gives an overall check sum of zero.

Furthermore, if the two address sequences have multiple contact points, then each contact point must be considered as a possible error location. This provides double error detection, although not all double byte errors are necessarily detected in this way. For example, if field type A and B have the same length, a double separator byte error pattern that interchanges $\Delta AB$ with $\Delta AA = \Delta BB = 0$ would recognize the field sequence $V_A\ \Delta AB\ V_B\ \Delta BB\ V_B$ as $V_A\ \Delta AA\ V_A\ \Delta AB\ V_B$.

Such double errors are not detectable by the symmetric difference coding (note that they do not imply loss of correct pointer alignment).

4. Representation of Tree-Structured Data

The symmetric difference approach will now be extended to irredundant packed sequential representation of hierarchial or tree-like data structures. This permits bidirectional scanning at any level of the tree, without the necessity of scanning intervening data.

Figure 4:
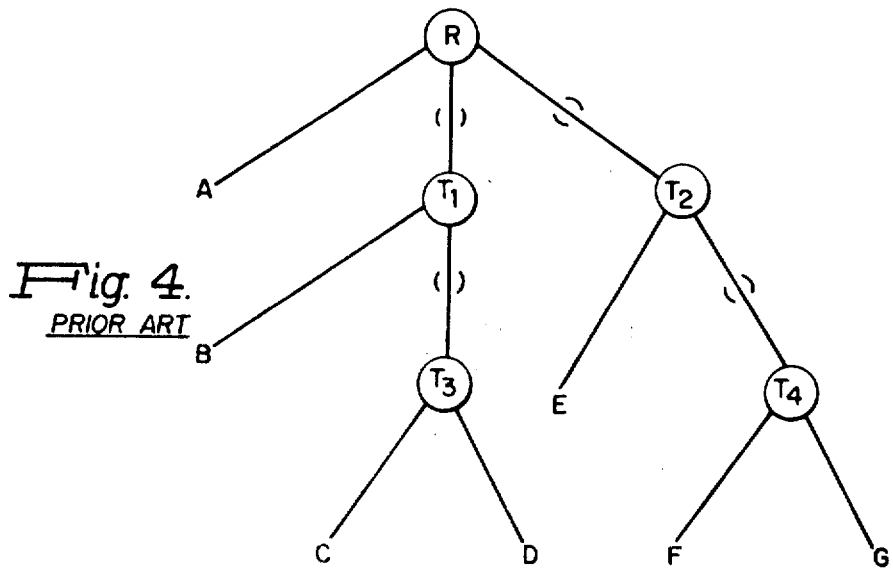
FIG. 4 is a prior art tree data structure utilized in the invention.

As an example, consider the tree structure of FIG. 4 in which A, B, etc., represent field types whose values $V_A$, $V_B$, etc., are to be stored sequentially in the order (ABCDEFG). Nonterminal nodes R (for root) and $T_k$ may have data fields (leaves of the tree) or other nodes (subtrees) attached to them. Branches leading to each subtree are surrounded by matched pair of parenthesis. The corresponding parenthesized linear representation of the tree may be reconstructed from FIG. 4 by reading off all branch and leaf labels while traversing the tree counter-clockwise: A (B(CD)) (E(FG)). (For definitions and discussion of Tree Structures see pps. 305–379 of Vol. 1, of The Art of Computer Programming by Donald E. Knuth, published by Addison-Wesley Publishing Company).

The value string corresponding to this representation is $V_A(V_B(V_CV_D))(V_E(V_FV_G))$. This string is unambiguous as long as "(" and ")" are reserved characters that do not appear in $V_A$ through $V_G$ or if $V_A$ through $V_G$ are of known, fixed or computable lengths. To avoid reserving the parenthesis characters, suppose they are considered as one-byte values of a special "punctuation" field type, $p$. In our example, $V_p$ is either ")" or "(" and must be embedded within field separators just like any other field. Applying symmetric difference coding to this field sequence gives this result, requiring two bytes per parenthesis character;

$\Delta 0A\ V_A\ \Delta Ap\ V_p\ \Delta pB\ V_B\ \Delta Bp\ V_p\ \Delta pC\ V_C\ \Delta CD\ V_D$
$\Delta Dp\ V_p$
$\Delta pp\ V_p\ \Delta pp\ V_p\ \Delta pE\ V_E\ \Delta Ep\ V_p\ \Delta pF\ V_F\ \Delta FG\ V_G$
$\Delta Gp\ V_p$
$\Delta pp\ V_p\ \Delta pp$ The two distinct meta-bracket values "(" and ")" may be replaced by two distinct reserved field types, in which case their values may be null. For example, using ↓ and ↑ to denote type codes for meta-brackets of type "(" and ")" respectively, and $\Delta AB$ to represent the symmetric difference of type codes A and B, the tree of FIG. 4 is representable as $\Delta 0A\ V_A\ \Delta A↓\ \Delta↓B\ V_B\ \Delta BC\ V_C\ \Delta CD\ V_D\ \Delta D↑\ \Delta↑↑\ \Delta↑↓$
$\Delta↓E$
$V_E\ \Delta E↓\ \Delta↓F\ V_F\ \Delta FG\ V_G\ \Delta G↑\ \Delta↑↑\ \Delta↑0$ This structure is efficient in storage because only one additional byte is needed for each embedded open or close parenthesis symbol. However, every field must still be scanned to traverse the tree, and this is not efficient for many applications. For example, suppose A represents an "if" condition, B(CD) represents a "then " clause and E(FG) an "else" clause of a parsed source language statement to be interpreted. After run-time evaluation of condition A the interpreter would like to scan B(CD) but skip E(FG), or skip B(CD) and then scan E(FG).

What is missing from the preceding tree representations? All of them are inefficient in the sense that a scan in either direction must still traverse every node and every leaf of the tree to get from the one end to the other.

If the tree has many nested levels, and if we are only interested in selecting one higher-level node, then much time will be wasted in such a scan. What is needed is a "subtree separator" which conveys information about the lengths of the complete substructures attached to its adjacent nodes. The rest of this section describes a tree structure representation which does permit skipping over subtrees, by reserving a single field type called an "internode separator" and using symmetric difference techniques to encode its contents.

Extension for Rapid Scanning — The preceding encoded representation of a tree structure is not efficient when a known path through the tree must be located. For example, on FIG. 4, suppose field F is known in advance to be attached to the first leaf of the second branch of the third branch attached to the root node. The extension proposed below will permit the scanner to skip the first two branches attached to the root node, then descend one level (to node $T_2$ on FIG. 4) and skip field E, arriving at field F in three jumps rather than the five jumps required to scan over A, B, C, D and E.

A new reserved field type code (denoted p) called an internode separator field, is needed. Its non-null value depends only on the lengths of the subtrees which it borders or separates, and is used to jump over a subtree in either direction. Symmetric difference coding is used on internode separator field values, to minimize storage requirements. Fields of type p are embedded in the field stream just like data and null field types. While a field-sequential scan merely recognizes and skips over internode separators (as with padding fields), a tree scanning algorithm must contain logic to recognize them and use them appropriately.

A typical length of two bytes is assumed for internode separators although other lengths may be utilized; this limits the maximum subtree length to 65K bytes; (if this is inadequate, a 24 bit value could be used). A stack is used with this method of scanning to save place markers (address pointers or offsets) for the beginning and end of the subtree being scanned (or one end and its length). The stack also permits a direct return from within any subtree to its root or parent node without going through other branches of this subtree.

It is simple to construct the proposed encoded form of a tree by a sequential scan of its parenthesized field structure. Each closing parenthesis, and each opening parenthesis that does not have a closing parenthesis as its immediate predecessor, is replaced by an internode separator field with a 2-byte value. A pair of parentheses of the form ")(" is combined into one internode separator field.

Within each internode separator field corresponding to a single open or close parenthesis will be placed the distance (in bytes) to the opposite matching parentheses. (This is analogous to the self-identifying field separators at block boundaries in section 3). Within the internode separator corresponding to a pair of "Close, open" or "),(" parentheses is placed the symmetric difference of the distances to their matching parentheses. (This construction is consistent with the previous encoding of field-lengths into field separators).

Each pair of matching parentheses plus all of its enclosed fields and nested parenthetical pairs correponds to one subtree and the branch connecting it to its parent node. For example, the tree of FIG. 4 contains 7 leaves and 4 subtrees. Its root node is labeled R and the root nodes of its subtrees are labeled $T_1$, $T_2$, $T_3$ and $T_4$.

The encoded representation of a subtree will be called a compound element, and represents a new byte-string-valued data type. That is, a compound element is any sequence of fields including internode separator fields, in which the latter obey certain constraints on their pairwise occurrences and contain appropriate length-defining values.

Compound elements may be nested. Note that the internode separators corresponding to open and close type parentheses are only distinguishable by tracking their positions relative to parent nodes; a separator position and value determines the location of its matching separator; the intervening internode separators specify inner structure at lower levels of the tree.

In FIG. 4, four compound elements are identified by parentheses around the branches leading to the root nodes of their corresponding subtrees. Only one pair of subtrees ($T_1$ and $T_2$) are adjacent to each other at the same tree level. The other two subtrees ($T_3$ and $T_4$) are isolated by fields or higher level brackets. Let $V_A$ denote a value string for a field of type A. Let $L_j$ denote the valve of a p-type field (instead of $V_p$). Define $L_j =$ length in bytes of (the encoded representation of) subtree $T_j$ in FIG. 4, and define $L_{ij} = L_i \oplus L_j$, the symmetric difference of $L_i$ and $L_j$. Then the tree structure of FIG. 4 requires the following sequence of field types to be encoded:

$ApBpCDppEpFGpp$ Substituting $V_A$ for $A$ etc., and $L_j$ or $L_{ij}$ for p we obtain the field value sequence
$V_A L_1 V_B L_3 V_C V_D L_3 L_{12} V_E L_4 V_F V_G L_4 L_2$ Appropriate field separators are inserted to punctuate this sequence of field values. Let $\Delta AB$ represent the singlebyte field separator between two value strings of fields of type A and B. Using this notation, the fully encoded linear representation for the tree of FIG. 4 is shown in FIG. 5.

Figure 5:
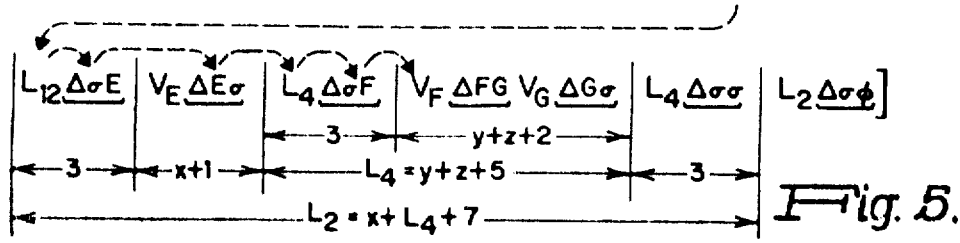
FIG. 5 is another embodiment of sequentially encoded data structures of the invention utilizing the tree data structure of FIG. 4.

FIG. 5 also illustrates the rules for computing compound element lengths. For each field which is a direct descendent of the compound element whose length is being computed, add the field's value string length plus one (separator) byte. For each nested compound element which is a direct descendent add its length plus three bytes (for a p-type field and its separator). Finally, add three bytes for the p-type field prefix to the compound element itself. This is illustrated on FIG. 5 for the subtree $T_2 = (E(FG))$; the lengths of $V_E$, $V_F$ and $V_G$ are denoted by $x$, $y$ and $z$ respectively.

To illustrate the scanning process, the example of FIGS. 4 and 5 will be used. Suppose we wish to access the field F which is known a priori to be on the first branch of subtree $T_4$. $T_4$ is on the second branch of subtree $T_2$, which is on the third branch at the top level of the tree.

The search for field F proceeds, for example, from the left edge of the encoded representation (FIG. 5) and follows the dotted lines:

1. Read $\Delta 0A$, lookup the length of $V_A$ and skip to $\Delta Ap$.
2. Read $\Delta Ap$, advance and read $L_1$, and skip to $\Delta pp$ which is followed directly by $L_{12}$.
3. Read $L_{12}$, compute $L_2 = L_1 \oplus L_{12}$, then stack the addresses of both $L_{12}$ and $L_2$. This will allow us to return from subtree $T_4$ to either the left or the right edge of the subtree $T_2$.
4. Advance to $\Delta pE$, lookup the length of $V_E$, and skip to $\Delta Ep$. Advance and read $L_4$ and stack its address and the address of $L_4$ (at the right edge of subtree $T_4$) which is Address $(L_4) \oplus$ Value $(L_4)$.
5. Advance to $\Delta pF$, which identifies F as the next field. This technique skips over three subtrees and descends two levels down into the tree structure. By unstacking the return address a return can be made immediately up any branch to the next higher level of the tree. The stacked address of the current subtree's left or right boundary is used to resume the scan in the forward or reverse direction, as desired. Internode separators within a subtree are located interior to these boundaries.

During the course of the scan, ambiguities may arise. The internode separator content does not specify whether it is an end of the current subtree, or an internode separator within it. This ambiguity is resolved by comparing the separator location to the end of the current subtree, which is one of the two subtree boundary locations on the top of the stack. Another way to resolve this ambiguity is to assign three distinct type codes $p_1$, $p_2$ and $p_3$ (first, last and intermediate) internode separator field types, corresponding to parenthesis symbols "(", ")", and ")(" respectively.

PREFERRED EMBODIMENTS

A First Preferred Embodiment

Figure 6A:
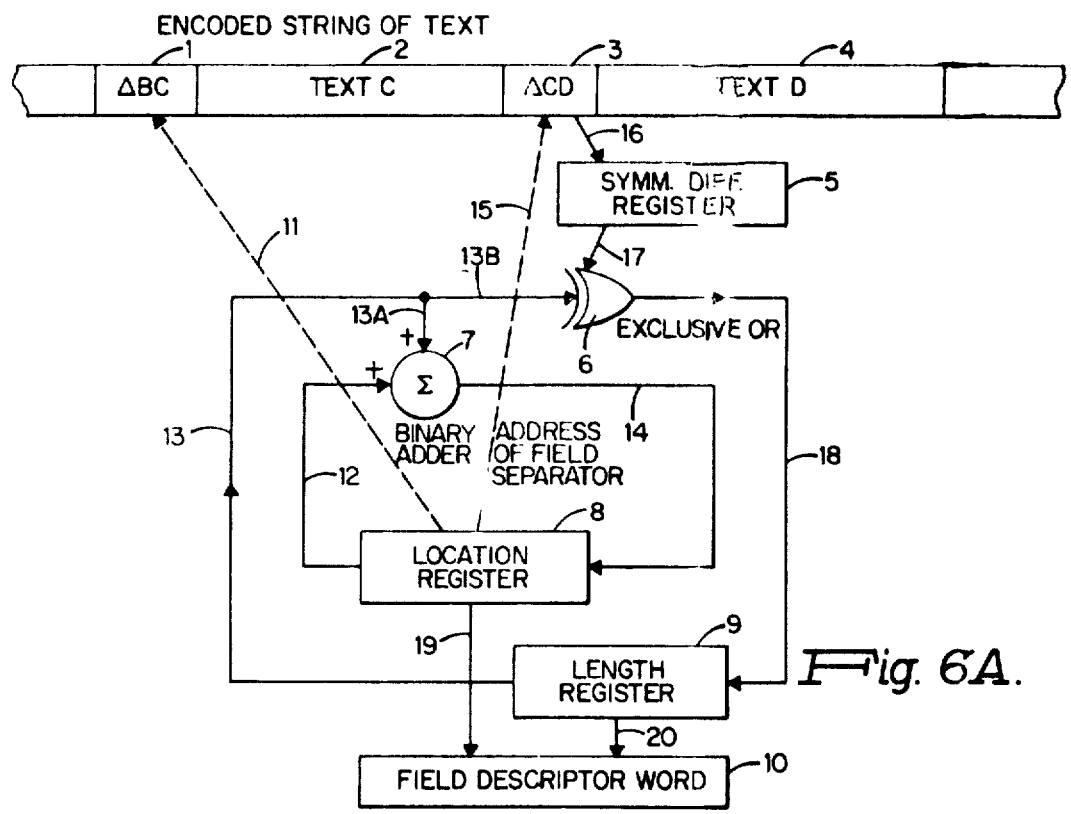
FIGS. 6A and 6B are logic block diagrams of the invention showing forward and backward scans respectively.
Figure 6B:
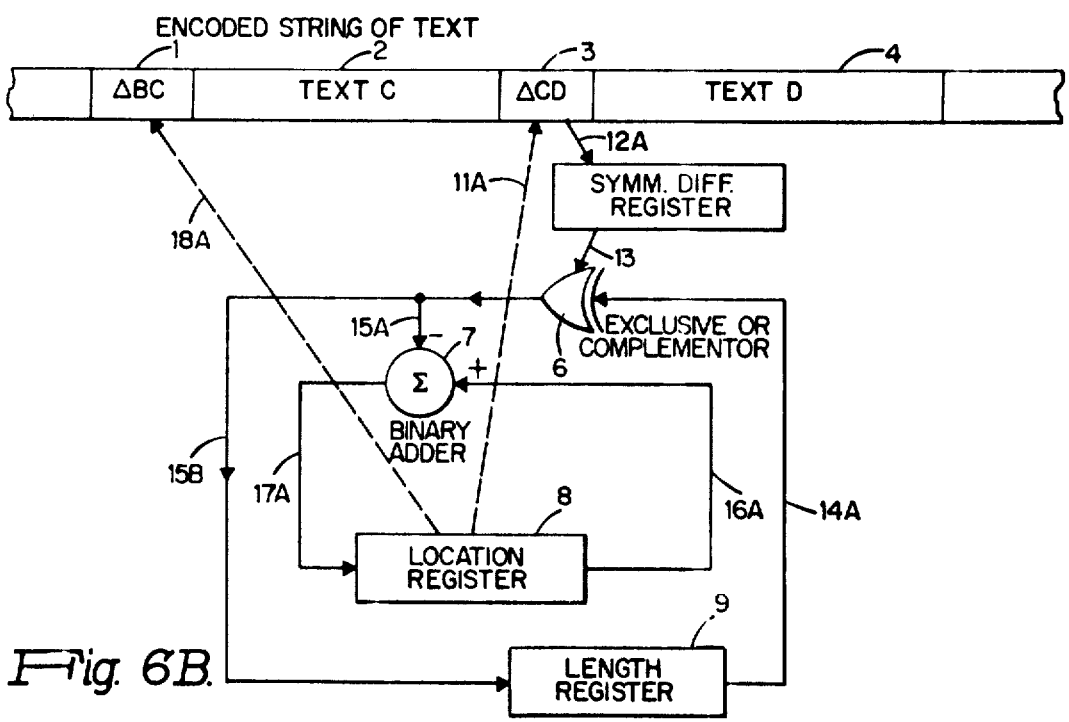

Referring to FIG. 6A and FIG. 6B, there is shown one embodiment of the invention in terms of hardware logic and registers for scanning an encoded string of text in the forward and backward directions. FIG. 6A shows the operation of the hardware when scanning in the forward direction during one cycle of operation of the hardware wherein one step of left-to-right scan from one piece of text to another piece of text of the encoded input string is accomplished. FIG. 6B shows the same string of text being scanned in the backward direction. It will be noted that the same numbers are used for the same elements of invention; however, it will be noted that the paths of the data are numbered differently. Also it should be noted that the paths of data are numbered consecutively in each diagram as they occur and will be more fully explained below. Referring first to FIG. 6A, there is shown a portion of an encoded string of text which contains two pieces of text called text C and text D denoted by numerals 2 and 4, respectively. Preceding text C is a symmetric difference separator ΔBC,1; between text C and text D is another symmetric difference separator ΔCD,3. The portion of a string of text 1, 2, 3 and 4 may be contained on a magnetic tape or other sequentially addressable storage media. It is of course understood that many encoded string of text reside in the storage medium selected. In this particular case, the logically defined string of text is in the virtual memory address space of a computer memory. The contents of location register 8 represents an offset or a number of characters between some reference mark on the storage medium and a particular separator such as ΔBC,1 or ΔCD,3. In a left to right scan when the location register 8 is updated so as to indicate a new location; for example, the relative offset address from such reference mark of separator ΔCD,3, is defined by adding to the length of text C,2 the relative offset address of separator ΔBC,1. Thus, the relative offset address of separator ΔCD,3 is defined on the storage medium relative to the reference mark previously selected. Generally, the reference mark selected is the beginning of the logically defined string of text in the virtual memory address-space of the computer memory. It can be seen that the exact same procedure may be utilized on a magnetic tape or other sequential storage medium.

Referring again to FIG. 6A, the hardware itself is comprised of three registers — a location register 8, a length register 9 and a symmetric difference register 5. In addition, binary adder 7 is provided to perform an ordinary binary addition or a binary subtraction. An exclusive-OR adder or complementor 6 is provided to perform carry-free exclusive-OR addition. (It will be noted that exclusive-OR addition is equivalent to complementing the output of a register such as length register 9 at those bit positions where exclusive-OR addition of a logical 1 is indicated by the second input. The contents of location register 8 and length register 9 together comprise a field descriptor word 10. The first portion of this word is the location of the beginning of a particular field of text being scanned which is contained in location register 8. The second part of the field descriptor word is the length of said particular piece of text being scanned which is contained in the length register 9. In FIG. 6A, an assumption has been made that preceding steps of a left-to-right or right-to-left scan have initialized location register 8 and length register 9 to contain the description of text C. In the next step of a typical scan of the invention, it is desired to scan the contents of the location register 8 and length register 9 and also the symmetric difference register 5 and perform the necessary operations in order to update location register 8 so that it contains the address of the new location ΔCD,3 and also to update length register 9 so it contains the length of the next string of text D,4. Before updating, it has been shown that location register 8 contains the location of symmetric difference separator ΔBC,1 (illustrated by a dashed arrow 11), and length register 9 contains the length of text C,2. Accordingly, in updating the registers, the contents of location register 8 are first transferred along path 12 to binary adder 7; at the same time, the contents of length register 9 are transferred along paths 13 and 13A to binary adder 7 and added to the contents of location register 8. When the binary addition is complete, the result of the addition is transferred along path 14 back to location register 8. The location register 8 now contains the location of symmetric difference separator ΔCD,3 preceding text D, as shown by dashed arrow 15. Simultaneously with the transfer of the contents of length register 9 into the binary adder 7, its contents are also transferred via the transfer path 13 and 13B into the exclusive-OR complementor 6. The symmetric difference separator ΔCD,3 as located by the updated contents of location register 8 (shown by dashed arrow 15) are loaded via path 16 into symmetric difference register 5 which are then loaded via path 17 into exclusive-OR complementor 6, where exclusive-OR addition (modulo 2 addition) is performed and the result of the exclusive-OR addition is transferred via path 18 back to length register 9. At this point in time, one cycle of the forward scan has been completed and location register 8 contains the location of symmetric difference separator ΔCD,3; length register 9 contains the length of text D,4 of the encoded string; and the symmetric difference register 5 contains the encoded symmetric difference ΔCD,3.

Refering now to FIG. 6B, one complete cycle of a backward scan will be described. At the beginning of the cycle of backward scan, it will be assumed that location register 8 contains the location (address or offset) of symmetric difference separator ΔCD,3 which separates text C from text D of an encoded string. Length register 9 contains the length of text D,4; whereas, symmetric difference register 5 contains the encoded symmetric difference separator ΔCD,3. In scanning backwards, (i.e. right-to-left) it is desired to find the location of ΔBC,1. In general, this will be done by generating the length of text C,2, from the symmetric difference separator ΔCD,3, and the length of text D,4, in exclusive-OR complementor 6 and then subtracting the length of text C,2, in binary adder 7, from the address in location register 8 of symmetric difference separator ΔCD,3. Accordingly, therefore, the symmetric difference separator ΔCD,3 is first loaded via path 12A into symmetric difference register 5 and then transferred via path 13C to exclusive-OR compelementor 6. The contents of length register 9 are then transferred via path 14A into exclusive-OR complementor 6 where carry-free exclusive-OR addition is performed and the results transferred back to length register 9 via path 15B; moreover, the results are also transferred via path 15A to binary adder 7. (Note in backward scan binary adder actually performs binary subtraction). Simultaneously the contents of location register 8 are also transferred to binary adder 7 where in this case binary subraction is performed to give the location (address or offset) of symmetric difference separator ΔBC,1, and this result is transferred via path 17A back into location register 8. Finally, symmetric difference separator ΔBC,1, is transferred over path 19A into symmetric difference register 5. The final result at this point in time of this cycle of backward scan is as follows: location register 8 now contains the address of symmetric difference separator ΔBC,1 pointed to by dashed arrow 18A; length register 9 contains the length of text C,2; and symmetric difference register 5 contains the contents of symmetric difference separator ΔBC,3. Since the backward scan cycle is the exact inverse of the forward scan cycle, any number of iterations of forward scan or backward scan can take place in any order at any time, and accordingly, complete freedom for bidirectional scanning is provided by the hardware mechanism just described.

The hardware shown on FIG. 6A and 6B was utilized to show how forward and backward scanning is accomplished when one field at a time is addressed by the computer. However, it is also possible to accumulate a table of field descriptor words in a computer memory which will then represent the location and length of each encoded piece of text exactly in an array which can be indexed in a way known for digital computers. In order to provide information and load such a table of field descriptors utilizing the hardware of FIGS. 6A and 6B, a field descriptor word 10 is generated. This field descriptor word is comprised of the contents of location register 8 and length register 9 which are supplied along paths 19 and 20, respectively. Utilizing, therefore, a computer having a memory which is provided with an index register (well known in the art) which counts the number of field such as A, B, C, D, and for each such field loads a field descriptor word into a corresponding element of a table in the memory, then the result of scanning in the forward direction from the beginning of a text string to the end is to have accumulated a table of field descriptor words which then identify the exact location and length of each text string.

A Second Embodiment of the Invention

Figure 7:
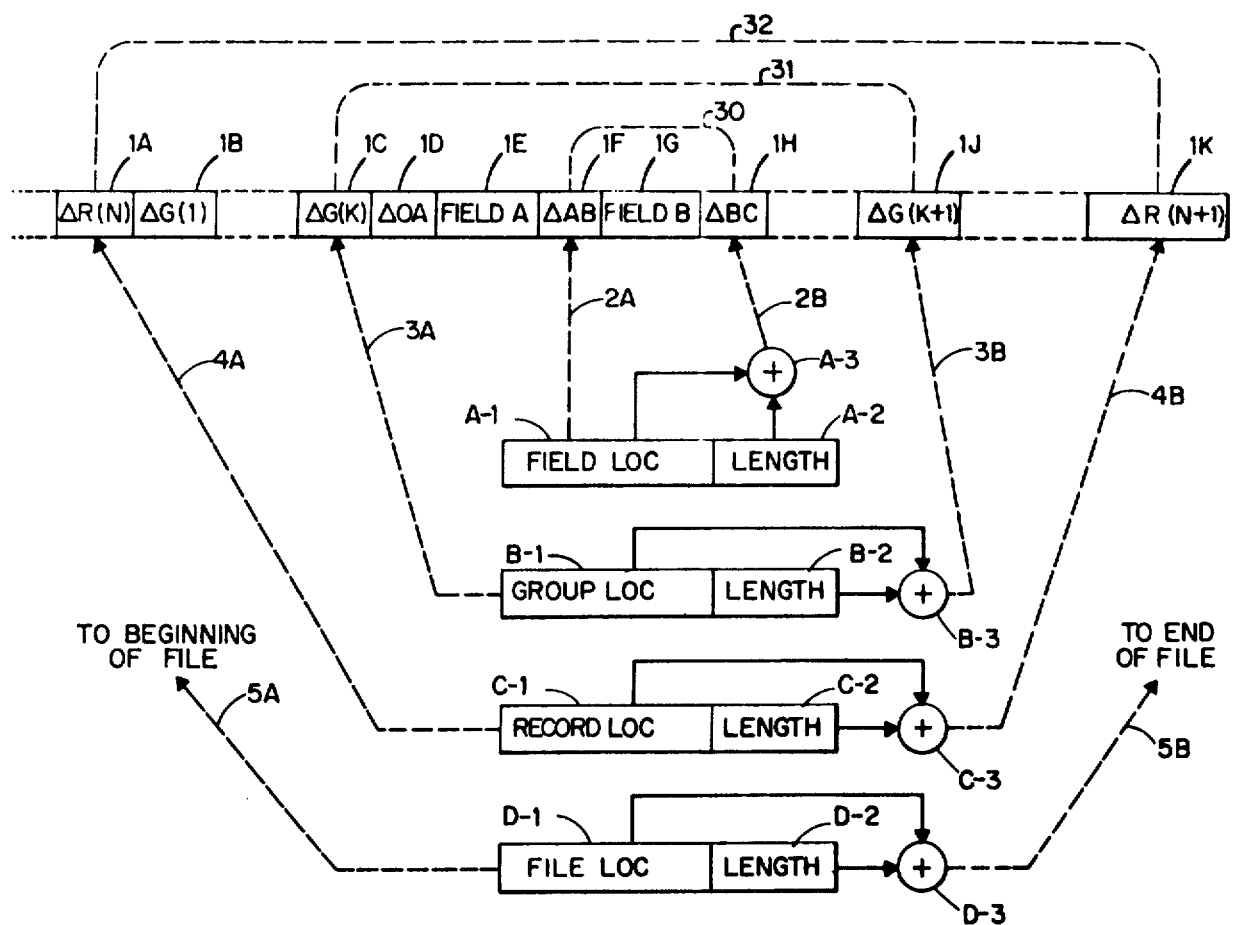
FIG. 7 is a logic block diagram of the invention for tree-type hierarchical data structures.

An extension of the hardward shown in FIGS. 6A and 6B supports a method of symmetric difference coding at multiple levels for hierarchical or tree structured data (this method of representation of tree structured data was discussed in Section 4 of the description of the invention in regard to FIGS. 4 and 5). FIG. 7 shows the additional hardware required to accumulate and store a sequence of descriptors for encoded strings of text at successively higher levels. In order to preserve clarity in describing the invention the various paths and the exclusive-OR complementor and symmetric difference register (shown on FIGS. 6A and 6B) are not shown. However, it is understood that the topmost register in FIG. 7, (A-1 and A-2) contains the field descriptor word, 10 of FIG. 6A. The hardware for each additional level of data is shown in FIG. 7 as a set of registers. In actual hardware these registers would together comprise a last-in, first-out, or LIFO stack mechanism, which means that additional registers may be added only at the top of FIG. 7 or the topmost register on FIG. 7 may be taken away (in an actual embodiment, an index register would keep track of the current topmost register on FIG. 7; registers above this one actually exist in the memory of a computer but are simply ignored). Thus, the structure and data paths of FIGS. 6A and 6B are operative and applicable to the topmost register of FIG. 7 which corresponds to a single node or subtree of the encoded data structure of FIGS. 4, 5 and 7.

In FIGS. 6A and 6B the encoded string of text was regarded as a single sequence of individual text pieces separated by symmetric difference separators all of which occurred at the same level; therefore, the only identification possible for a single piece of text is its location with respect to the beginning of the text string and its length. With respect to FIG. 7 larger or smaller pieces of text may be described at different levels of grossness or detail. The encoded string of text on FIG. 7 is more complex. A sequence of fields, A, B, etc., (1C thorugh 1H) has been collected together into a group called G(K). This group is enclosed within two separators ΔG(K), 1C and ΔG(K + 1), 1J. Each field A, B, etc., within the group is separated by a symmetric difference separator such as ΔAB,1F,ΔBC,1H etc. Before the first field within this particular group, field A,1G, is a separator Δ0A,1D, which contains the length of field A, 1G(including one separator). (Note that there may be many fields within a group and also many groups within a record; each field is separated from another field by a symmetric difference separator and each group is separated from another group by a symmetric difference separator etc.).

This collection of field and groups is subdivided at another higher level called a record, and each record is enclosed within two symmetric difference separators ΔR(N), 1A, and ΔR(N + 1), 1K. The next higher level of data is the file which also has symmetric difference separators (not shown) between files. Note that dash line 30 delineates one field between separators, dash line 31 delineates one group, and dash line 32 delineates one record.

Given that the particular heirarchical structure contains 4 levels, the additional hardware structure over the embodiment of FIGS. 6A and 6B, is a file location register D-1 and a file length register D-2; a record location register C-1, and a record length register C-2; a group location register B-1, and a group length register B-2; a field location register A-1, and a field length register A-2. In general the number of these registers is variable and they are stored in computer memory. In FIG. 7 a binary adder D-3, C-3, B-3 and A-3 respectively are shown provided to add the contents of the location and the length register in order to obtain the length of the opposite end of the data group being scanned. However, one binary adder can be utilized for all these registers because only the topmost register of the stack actually participates in the scanning operations of FIGS. 6A and 6B. The only difference when group, record, or file descriptions instead of field descriptions are located in the topmost stack registers is that internode separators must be extracted from fields (see FIG. 5) instead of from field separators. Similarly, an exclusive-OR circuit may be provided for each level of data or one exclusive OR circuit with appropriate gating may be provided for just the topmost level of data being scanned. (The techniques of LIFO stack maintenance, sequencing and gating data are well-known in the computer art and need not be further discussed in this disclosure). NOte that dashed line 30 delineates one field between separators, dash line 31 delineates one group, and dash line 32 delineates one record.

Referring again to FIG. 7 the location and length of the file are stored in the file location register D-1, and the file length register D-2 respectively. The file location register D-1 contains the relative offset location of the beginning of the complete file or tree structure organization of data. This is indicated by dashed arrow 5A pointing to the beginning of the file which is not shown on FIG. 7. By adding the file length register D-2 contents to the contents of file location register D-1 in binary adder D-3 the end point of final position of the complete file is located as indicated by dashed arrow 5B. This end point may also mark the beginning of the next sequential file for determining its length. The file is envisioned not as a sequence of fields of small size but as a sequence of record each of which may be subdivided into groups which are then further subdivided into fields. Assuming, therefore, it is desired by the user, programmer, operating system etc. to find field B within group K of record N on the data structure represented in FIG. 7. In order to find record N, the beginning of the file as indicated by file location register D-1 is obtained, with registers D-1, D-2 at the topmost stack location. This beginning therefore forms the reference point with respect to the location of records contained in this file. Accordingly, a second register C-1, C-2 is pushed onto the stack and initialized to the first record separators $\Delta R(1)$, location and the record length $\Delta R(1)$ respectively. By a slight adaptation of the techniques described with respect to FIG. 6A, left-to-right scan is made of all symmetric difference separators for the records. This record scan is repeated N times (skipping over group and field symmetric difference separators) until the location of the required record R(N), 1A, is obtained. When the required record is reached record location register C-1 contains the address or offset of record N from the beginning of the file, and record length register C-2 contains the length of record number N. Having thus located record number N a search is begun within record N for a group number K. In order to do this while still retaining the capability of returning to the location of record N and from there jumping or scanning to other prior (N-1, N-2, etc.) or successor records (N + 1, N + 2, etc.), a new group descriptor word is constructed in group location register B-1 and group length location register B-2, on top of the stack. Initially when entering the subordinate level of data organization within record N, the group descriptor word in registers B-1 and B-2 will contain the location and length of the first group within record number N. The location of the first group (actually of its left-hand separator $\Delta G(1)$) is shown as component 1B in FIG. 7. The forward scan of the group then continues for K cycles until the desired group number K within record number N is reached. At this point in time, the group location register B-1 contains the location of group separator $\Delta G(K)$, 1C. This is indicated by dashed arrow 3-A on FIG. 7. At the same time group length register B-2 contains the length of group K which is indicated by dashed line 31. The significance of dashed line 31 is that, starting at the left end of group K, group number (K + 1) may be located by adding the group relative offset contained in group location register B-1 to the group length contents of group length register B-2, in binary adder B-3. However, in this particular example it has been assumed that it is desired to enter group K and scan through the fields to locate a particular field B,1G. In order to do this another field descriptor word is provided by adding field registers A-1 and A-2 containing the location and length of the first field of group K, to the stack of descriptor registers. Once again by successively applying a number of forward scan cycles at the field level the field location and length registers A-1 and A-2 are updated until they point to the symmetric difference field separator $\Delta AB,1F$, which is the address of field B,1G, that was desired by the user. At this point in time, therefore, field location register A-1 contains the address or offset from a reference point at which is contained field separator $\Delta AB,1E$ while field length register A-2 contains the length of field B,1G. In order to reverse this process, it is only necessary to pop, or remove from the stack, the contents of field registers A-1 and A-2 and ignore them in order to return to the group level of the tree structure at which point group levels may be scanned forwards or backwards. On the other hand, once having reached field B, it may be desired to continue scanning at the field level; then the field location and length registers A-1 and A-2 would not be cleared. Similarly, any level may be entered in the backward scan. Hence, it has been shown how a user, whether it be a programmer or the operating system, can access successive components at any level of the data structure without scanning each and every lower level structure. In the simplest case the user (e.g. operating system) knows precisely which numbered record within the file is to be accessed and furthermore it knows precisely which group within the record is to be extracted and which particular field within the group is to be extracted.

An alternate criteriator utilizing this hardware to locate and detect particular portions of a tree structured data organization requires additional known hardware such as comparators or an associative memory. In this alternate method a particular record or a particular group is to be selected on the basis of the content of a particular field or fields within the record or group. Scanning based on inspecting the contents of the specified field proceeds as before using the field descriptor register pair D-1, D-2, to locate the field against which a particular value is matched, wherein scanning may then descend to a next lower level and the process may be repeated. For example, a search over a set of records to locate a record with a particular field value proceeds by extracting the contents of a specified field of each record, and comparing said content to a desired key value if the values match the desired field within the record, the desired record has been located. Similarly, it can be seen that if a scan is successful in locating a given record, a search may then be initiated within the given record until a match is obtained to a designated group key field value, wherein another scan may be initiated then at the field level until a match is made at the field level with a predesignated field value.

It will be apparent from the foregoing disclosure of the invention that numerous modifications, changes and equivalents will now occur to those skilled in the art, all of which fall within the true scope contemplated by the invention.

GLOSSARY (From Fundamental Algorithms - Vol. 1 - The Art of Computer Programming, Donald E. Knuth, Addison-Wesley Publishing Company).

| | |
|---|---|
| Atomic element | — An element from a universe of objects that might be desired. |
| Tree | — A finite set T of one or more nodes such that: (a) there is one specially designated node called the root of the tree (T); and, (b) the remaining nodes (excluding the root) are |
| Subtrees | partitioned into m ≥ 0 disjoint sets $T_1,..., T_m$, and each of these sets in turn is a tree. The trees $T_1,... T_m$ are called the subtrees on the root. |
| Root | — A specially designated node of a tree. |
| Node | — One or more consecutive words of a computer memory, divided into named parts called fields. (Synonyms for nodes are records, entities, beads). |
| Degree of Node | — The number of subtrees of a node. |
| Terminal Node or Leaf | — A node of degree zero. |
| Branch Node | — A non-terminal node. |
| Level of a Node | — The level of a node with respect to T wherein the root has level 1, and other nodes have a level that is one higher than they have with respect to the subtree of the root $T_j$, which contains them. |
| Forest | — A set of zero or more disjoint trees. Also, the nodes of a tree excluding the root. |
| Linear List | — A set of m ≥ 0 nodes whose structural properties involve only the one dimensional relative position of nodes. |
| Stack | — A linear list for which all insertions and deletions are made at one end of the list. |
| Queue | — A linear list for which all insertions are made at one end of the list; all deletions (and usually all accesses) are made at the other. |
| Dequeue (double-ended queue) | — A linear list for which all insertions and deletions are made at the ends of the list |

What is claimed is:

1. A bidirectional scanning apparatus for determining, in a forward or reverse direction, the address of a next sequential field desired in a sequence of fields of variable length, said fields in said sequence being separated from each other by symmetric difference separators, each symmetric difference separator comprised of the carry-free exclusive-OR addition of the values of the lengths of its adjacent fields on either side of said symmetric difference separator, said bidirectional scanning apparatus comprising:
   a. first means, responsive to one of said sequential difference separators currently being scanned and to a length or type code for one adjacent field of said one of said sequential difference separators, for generating the length or type code of the other adjacent field;
   b. second means, coupled to said first means, for storing the location of the field currently being scanned; and,
   c. third means, coupled to said first and second means, for algebraically adding the length of either adjacent field to the location of the separator preceding the left edge of the field currently being scanned, whereby the address of the next sequential field separator desired is generated.

2. The bidirectional scanning apparatus as recited in claim 1 wherein said first means is comprised of a carry-free exclusive-OR adder.

3. The bidirectional scanning apparatus as recited in claim 1 wherein said first means is comprised of an adder for performing signed algebraic addition.

4. The bidirectional scanning apparatus as recited in claim 1 wherein said first means is a modulo $2^k$ adder for modulo $2^k$ adding the $k$-bit field separator currently being scanned to the length of an adjacent field of said difference separator currently being scanned.

5. The bidirectional scanning apparatus as recited in claim 1 wherein said third means is a binary adder.

6. The bidirectional scanning apparatus as recited in claim 2 wherein said third means is a binary adder.

7. The bidirectional scanning apparatus as recited in claim 3 wherein said third means is a binary adder.

8. The bidirectional scanning apparatus as recited in claim 4 wherein said third means is a binary adder.

9. A bidirectional scanning apparatus for determining, in a forward or reverse direction, the address of a next sequential field desired in a sequence of fields of variable length, said fields in said sequence being separated from each other by symmetric difference separators, each symmetric difference separator comprised of the carry-free exclusive-OR sum of the lengths of its adjacent fields on either side of said symmetric difference separator, said bidirectional scanning apparatus comprising:
   a. first means, responsive to one of the symmetric difference separators currently being scanned and to an adjacent field of said one of said symmetric difference separators, for exclusive-OR adding, carry-free, said one of said symmetric difference separators to said adjacent field of said one of said symmetric difference separators;

b. second means, coupled to said first means, for storing the address of the field currently being scanned; and, c. third means, coupled to said first and second means, for binarily adding or subtracting the length of the other adjacent field to the address of the field currently being scanned, whereby the address of the next sequential field desired is generated.

10. The bidirectional scanning apparatus as recited in claim 9 including fourth means, coupled to said first means for storing the results of said exclusive-OR addition.

11. The bidirectional scanning apparatus as recited in claim 10 including fifth means, coupled to said third means, for storing the results of said binary addition.

12. The bidirectional scanning apparatus as recited in claim 11, including sixth means coupled to said first means, for storing said symmetric difference separator currently being scanned.

13. The bidirectional scanning apparatus as recited in claim 12, including seventh means, coupled to said fourth and fifth means for generating an array of field descriptor words for accumulation as a table of field descriptor words in a computer storage device.

14. A bidirectional scanning apparatus for scanning in a forward or reverse direction sequential tree structured data (i.e. hierarchical data) subdivided into file, record, group and field data structures, said file data structures being stored in sequence and separated from each other by file symmetric difference separators associated with respective ones of said adjacent file data structures, said record data structures being in sequence within said file data structures and separated from each other by record symmetric difference separators associated with respective ones of said adjacent record data structures, said group data structures being in sequence within said record data structures and separated from each other by group symmetric difference separators associated with respective ones of said adjacent group data structures, and said field data structures being in sequence within said group data structures and separated from each other by field symmetric difference separators associated with respective ones of said adjacent field data structures, each symmetric difference separator comprised of the carry-free exclusive-OR addition of the lengths of its associated adjacent data structures, said bidirectional scanning apparatus for further determining the address of a next sequential data structure desired at any level, said bidirectional scanning apparatus comprising:

a. first means, responsive to a first of said sequential difference separators currently being scanned and to the length of a first adjacent data structure associated with said first of said symmetric difference separators, for carry-free exclusive-OR addition of said first of said symmetric difference separators to said length of said first adjacent data structure;

b. second means, coupled to said first means, for storing the address of said first symmetric difference separator associated with said first data structure;

c. third means, coupled to said first means, for storing the signed length of a second data structure generated by said first means, and associated with said first symmetric difference separator; and, d. fourth means, coupled to said second and third means, for binarily adding the signed length of said second data structure to said address of said first symmetric difference separator, whereby the address of the next sequential data structure desired is generated.

15. The bidirectional scanning apparatus as recited in claim 14 wherein said second means further includes fifth means for storing the address of a first file data structure currently being scanned, and said third means further includes sixth means for storing the length of said file data structure.

16. The bidirectional scanning apparatus as recited in claim 15 wherein said second means further includes seventh means for storing the address of first record data structure within said file structure, and said third means further includes eighth means for storing the length of said first record data structure.

17. The bidirectional scanning apparatus as recited in claim 16 wherein said second means further includes ninth means for storing the address of a first group data structure within said record structure, and said third means further includes tenth means for storing the length of said first group data structure.

18. The bidirectional scanning apparatus as recited in claim 17 wherein said second means further includes eleventh means for storing the address of a first field data structure within said first group data structure, and said third means further includes twelfth means for storing the length of said first field data structure.

19. The bidirectional scanning apparatus as recited in claim 18 wherein the number of levels of grouping within group is not restricted, said tree structured data having any number of levels.

20. The bidirectional scanning apparatus as recited in claim 19 including zero length field type data structure between two adjacent separators (e.g., ΔA0, Δ0B), for permitting padding of field sequences to fixed size block boundaries.

21. The bidirectional scanning apparatus as recited in claim 20 including a null border field structure adjacent to the first field so that the leftmost field separator may be the symmetric difference of the leftmost field length and the zero valued nullfield length whereby the leftmost field length is self-identifying.

* * * * *